(12) United States Patent
Moser

(10) Patent No.: US 8,870,303 B2
(45) Date of Patent: Oct. 28, 2014

(54) INTEGRATED TRACK ADJUSTMENT/RECOIL UNIT AND TRACK TYPE MACHINE USING SAME

(75) Inventor: Todd Edwin Moser, Roanoke, IL (US)

(73) Assignee: Caterpillar Inc., Peoria, IL (US)

( * ) Notice: Subject to any disclaimer, the term of this patent is extended or adjusted under 35 U.S.C. 154(b) by 354 days.

(21) Appl. No.: 13/413,165

(22) Filed: Mar. 6, 2012

(65) Prior Publication Data
US 2013/0233628 A1    Sep. 12, 2013

(51) Int. Cl.
*B62D 55/30*    (2006.01)

(52) U.S. Cl.
USPC ............................. 305/148; 305/143; 305/149

(58) Field of Classification Search
CPC ....... B62D 55/08; B62D 55/30; B62D 55/305
USPC ................................... 305/143, 145, 148, 149
See application file for complete search history.

(56) References Cited

U.S. PATENT DOCUMENTS

| | | | |
|---|---|---|---|
| 2,837,380 A | 6/1958 | Mazzarins | |
| 3,539,229 A | 11/1970 | Scully | |
| 3,645,586 A | 2/1972 | Piepho | |
| 3,692,368 A | 9/1972 | Alexander | |
| 3,787,097 A * | 1/1974 | Orr | 305/145 |
| 3,792,910 A | 2/1974 | Kaufman et al. | |
| 3,912,335 A | 10/1975 | Fisher | |
| 4,323,283 A | 4/1982 | Muramoto et al. | |
| 4,457,564 A * | 7/1984 | Ruge et al. | 305/149 |
| 4,470,583 A | 9/1984 | Peiffer et al. | |
| 4,681,376 A | 7/1987 | Riml | |
| 4,854,650 A * | 8/1989 | Getz et al. | 305/148 |
| 4,859,006 A | 8/1989 | Philippe et al. | |
| 6,027,185 A * | 2/2000 | Crabb | 305/148 |
| 6,354,678 B1 | 3/2002 | Oertley | |
| 6,682,155 B2 * | 1/2004 | Hoff et al. | 305/145 |
| 7,156,185 B2 | 1/2007 | Juncker | |
| 7,172,257 B2 * | 2/2007 | Tamaru et al. | 305/145 |
| 7,252,349 B2 | 8/2007 | Livesay et al. | |
| 8,011,740 B2 * | 9/2011 | Matthys | 305/148 |
| 8,348,356 B2 * | 1/2013 | Ehuraj | 305/148 |
| 8,528,671 B2 * | 9/2013 | Beasley et al. | 180/9.1 |
| 2007/0087876 A1 | 4/2007 | Ward et al. | |
| 2008/0265666 A1 | 10/2008 | Livesay et al. | |
| 2009/0200862 A1 | 8/2009 | Matthys | |

FOREIGN PATENT DOCUMENTS

| | | |
|---|---|---|
| DE | 1158379 | 11/1963 |
| GB | 1442857 | 7/1976 |
| WO | 8303803 | 11/1983 |
| WO | 8704987 | 8/1987 |

* cited by examiner

*Primary Examiner* — Kip T Kotter
(74) *Attorney, Agent, or Firm* — Baker Hostetler

(57) ABSTRACT

An integrated track adjustment/recoil unit is compressed between a front track roller frame and rear track roller frame of telescopic track roller frame during a recoil event. The integrated track adjustment/recoil unit defines an oil volume separated from a gas volume by a recoil piston, which moves closer to the idler along a recoil line responsive to a recoil event.

15 Claims, 4 Drawing Sheets

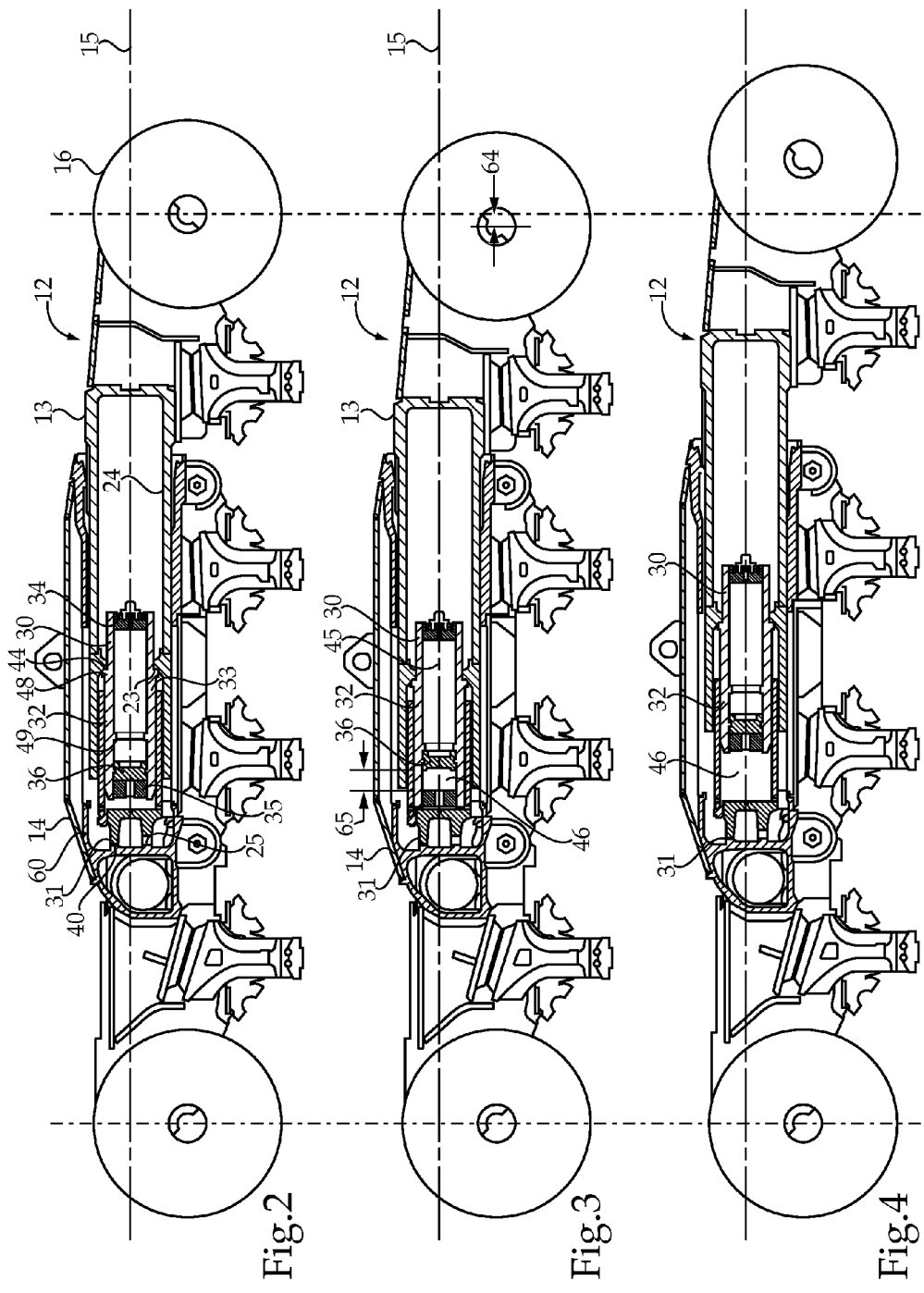

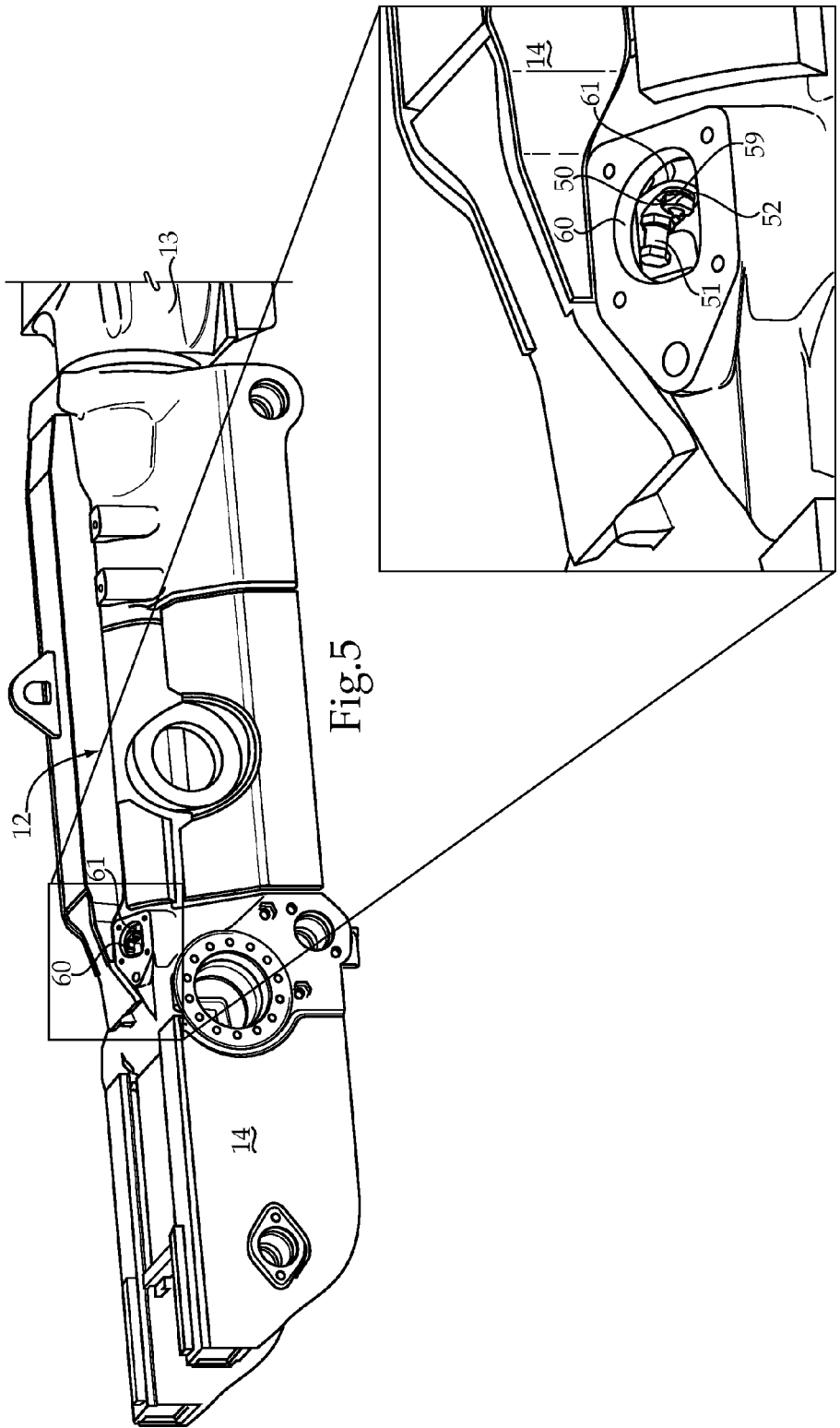

INTEGRATED TRACK ADJUSTMENT/RECOIL UNIT AND TRACK TYPE MACHINE USING SAME

TECHNICAL FIELD

The present disclosure relates generally to dynamic recoil events for track type machines, and more particularly to an integrated track adjustment/recoil unit for a telescopic track roller frame.

BACKGROUND

Track type tractors are one type of machine that utilize an idler recoil system in order to better allow the tracks of the machine to interact with variable loads encountered when the machine is being maneuvered over the ground. A typical track system may include a forward idler that is supported by a track roller frame assembly about which the track is mounted. The idler may typically be connected to a yoke that may slide fore and aft within the track roller frame assembly in order to react to various loads that are transmitted from the track to the idler. The yoke in turn acts upon a spring that is compressed when the idler and yoke are pushed into the track roller frame assembly. The spring then pushes back on the yoke and idler to recoil both toward their undisturbed operating configuration.

In the past, recoil springs were usually made up of heavy mechanical springs. More recently, such as shown in co-owned U.S. Pat. No. 7,252,349, gas springs have been gaining wider acceptance and usage. Gas springs have the advantage over conventional mechanical springs in that their pre-load can be adjusted by adding or removing gas, such as nitrogen, to and from the gas spring. The '349 patent is also of interest for teaching the inclusion of a track tensioning feature located between the yoke and the gas spring of the recoil system. In particular, a grease volume may be filled with a selected volume of grease to adjust the effective distance between the gas spring and the yoke, thereby adjusting a forward position of the idler, and consequently the tension in the track that is mounted about the track roller frame assembly.

Although a variety of track roller frame assemblies and their associated recoil systems have performed well over many years, there remains room for improvement, particularly in the areas of assembly, packaging and servicing. For instance, the '349 patent teaches a recoil and adjustment system for a track type tractor in which the various components of the recoil system are individually attached within the track roller frame housing. This construction can make assembly more cumbersome and give rise to possible misalignment compensation strategies associated with a line of force from the idler, through the yoke, through the tensioning adjustment system and finally to the recoil gas spring.

Co-owned U.S. Patent Application Publication 2009/0200862 shows another incremental improvement in that the idler recoil and track adjustment device is a separate unit that is preassembled and installed into a track roller frame as an assembled unit at the time of manufacture of the track type machine. In this design, the remote end of the unit is supported in a socket defined by an internal surface of the track roller frame, while the yoke end is supported by, and attached to, a bulkhead of the track roller frame by an array of fasteners that surround the recoil shaft. While this design has shown considerable promise, there remains room for improvement, especially with regard to packaging, servicing, installation, cost and performance.

The present disclosure is directed toward one or more of the problems associated with recoil systems for the machines including but not limited to assembly, packaging and servicing.

SUMMARY

In one aspect, an integrated track adjustment/recoil unit includes an accumulator module received in a bore of a track adjust cylinder. The accumulator module includes a gas plug and a recoil stop mounted at opposite ends of a hollow cylinder, and further includes a recoil piston slidably received in the hollow cylinder. The recoil stop defines an oil passage therethrough, and includes a first stop surface. The recoil piston is trapped to move between contact with the first stop surface and a second stop surface of the hollow cylinder. The track adjust cylinder includes a rear frame contact surface, and the hollow cylinder includes a front frame contact surface. The hollow cylinder, the recoil piston and the gas plug define a gas volume. The track adjust cylinder, the hollow cylinder, the recoil stop and the recoil piston define an oil volume. The recoil piston is biased toward the first stop responsive to gas pressure in the gas volume.

In another aspect, the track type machine includes a machine body with a telescopic track roller frame that includes a front track roller frame slidably received in a rear track roller frame along a recoil line. An idler is mounted in the front track roller frame. A track is mounted about the telescopic track roller frame in contact with the idler. An integrated track adjustment/recoil unit is operably mounted between the front track roller frame and the rear track roller frame. The integrated track adjustment/recoil unit defines an oil volume separated from a gas volume by a recoil piston. The recoil piston moves closer to the idler along the recoil line responsive to a recoil event in which the front track roller frame moves into the rear track roller frame.

In still another aspect, a method of operating a track type machine includes moving the machine by moving a track around a telescopic track roller frame. A front track roller frame of the telescopic track roller frame moves into a rear track roller frame responsive to a recoil force. Movement of the front track roller frame is resisted by compressing an integrated track adjustment/recoil unit between the front track roller frame and the rear track roller frame. The compressing step includes moving a recoil piston toward an idler mounted on the front track roller frame.

BRIEF DESCRIPTION OF THE DRAWING

FIG. 2 is a side sectioned view of a telescopic track roller frame in an example installation;

FIG. 3 is a side sectioned view through the telescopic track roller frame of FIG. 2 at full recoil;

FIG. 4 is a side sectioned view of a telescopic track roller frame in a full adjust configuration;

FIG. 5 is a perspective view of oil valves for an integrated track adjustment/recoil unit seen through an access opening of the telescopic track roller frame of FIG. 2;

FIG. 6 is a close up view of the access opening of FIG. 5;

DETAILED DESCRIPTION

Figure 1:
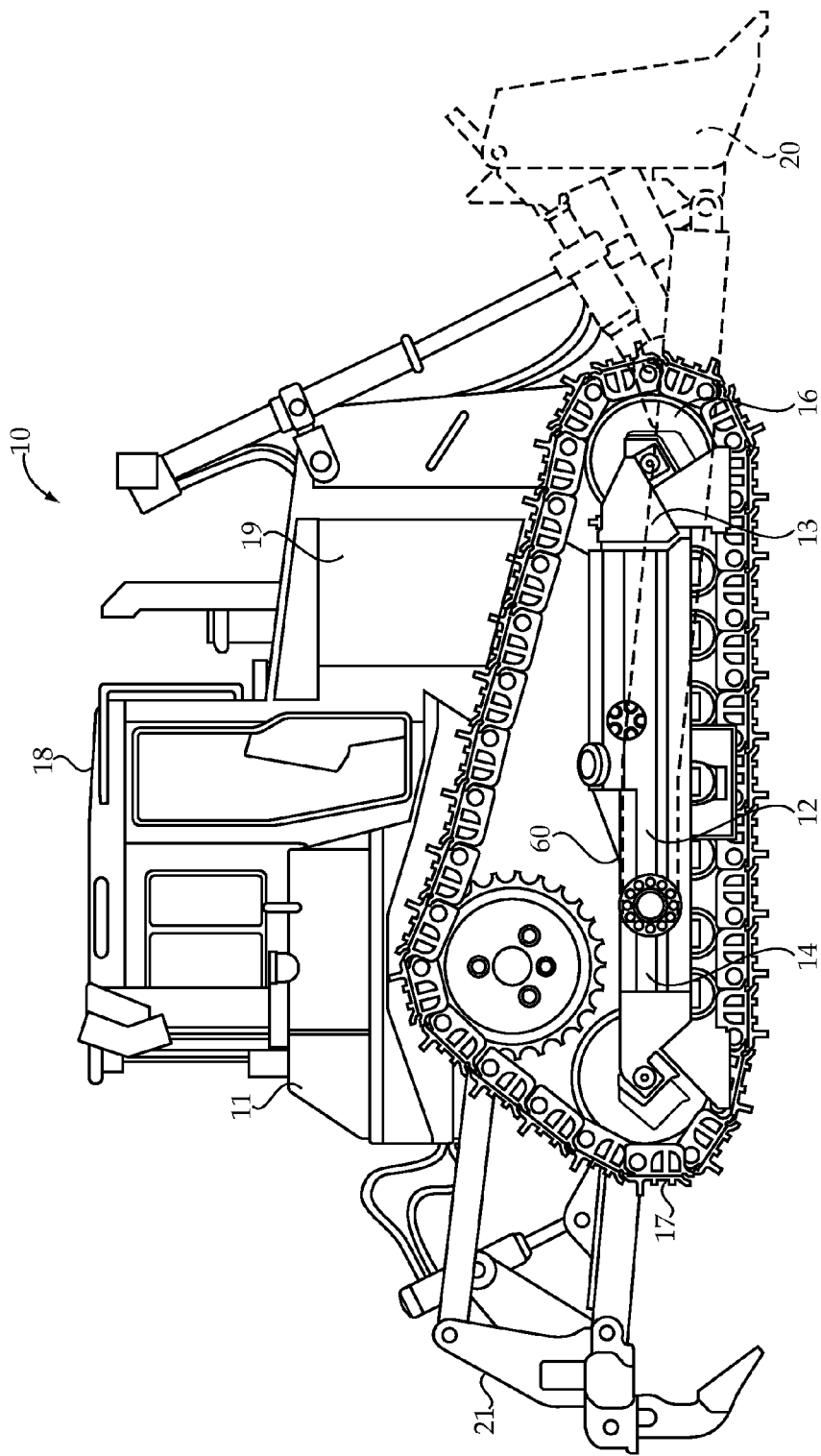
FIG. 1 is a side view of a track type machine according to the present disclosure.
Figure 7:
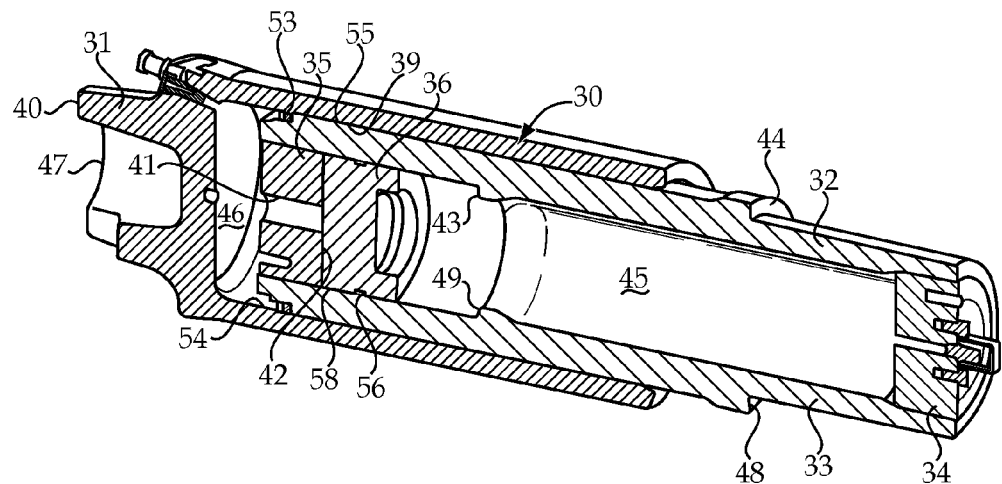
FIG. 7 is a perspective sectioned view of the integrated track adjustment/recoil unit from FIG. 2.
Figure 8:
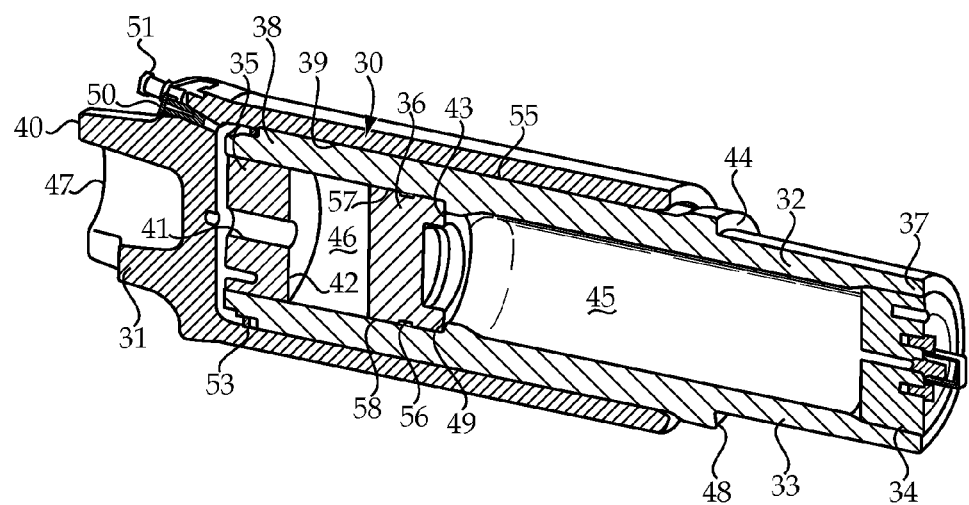
FIG. 8 is a perspective sectioned view of the integrated track adjustment/recoil unit from FIG. 3 at full recoil.

Referring initially to the Figures, a track type machine 10 includes a machine body 11 supported by a track 17 that is mounted about a telescopic track roller frame 12. Telescopic track roller frame 12 includes a front track roller frame 13 that is slidably received in a rear track roller frame 14 along a recoil line 15. The track 17 moves around telescopic track roller frame 12 in contact with an idler 16 that is mounted in the front track roller frame 13. An integrated track adjustment/recoil (ITAR) unit 30 is mounted between the front track roller frame 13 and the rear track roller frame 14. Track type machine 10 is typical in that it includes hydraulically operated implements, in this case a blade 20 and a ripper 21 that are indirectly powered by an engine 19 and controlled from an operator station 18.

The ITAR unit 30 defines an oil volume 46 separated from a gas volume 45 by a recoil piston 36. The gas volume 45 is filled with an appropriate gas, such as nitrogen, at a predetermined pressure in order to act as a pneumatic spring to bias recoil piston 36 toward contact with a recoil stop 35. During a recoil event, the recoil piston 36 moves closer to the idler 16 along the recoil line 15 responsive to a recoil event in which the front track roller frame 13 moves into the rear track roller frame 14. For example, FIG. 2 shows telescopic track roller frame 12 before a recoil event, and FIG. 3 shows the same frame at full recoil where the recoil piston 36 is moved a piston travel distance 65, which is greater than a recoil distance 64.

Referring specifically to FIGS. 5-8, the ITAR unit 30 includes a track adjust cylinder 31 that defines a bore 39, and includes a rear frame contact surface 40 in contact with a contact surface 25 of the rear track roller frame 14. The ITAR unit also includes an accumulator module 32 that is received in bore 39 of the track adjustment cylinder 31. The accumulator module 32 includes a gas plug 34 and recoil stop 35 mounted at opposite ends 37 and 38, respectively, of a hollow cylinder 33. Recoil piston 36 is slidably received in hollow cylinder 33. The front track roller frame 13 includes an annular shoulder 23 on an inside surface 24 that bears in contact with a front frame contact surface 44 of hollow cylinder 33. Thus, a recoil force acting along recoil line 15 is transmitted from annular shoulder 23 on the inside surface 24 of front track roller frame 13 to an annular shoulder 48 on an outside of hollow cylinder 33. The recoil force is then transmitted from an end 47 of the ITAR unit 30 to contact surface 25 of rear track roller from 14. Although not necessary, in the illustrated embodiment, the ITAR unit 30 is unattached to, but trapped inside, the telescopic track roller frame 12. In other words, in illustrated embodiment there are no fasteners that attach the ITAR unit 30 to the telescopic track roller frame 12. Nevertheless, this disclosure contemplates and encompasses ITAR units that are attached to the surrounding truck roller frame.

The oil volume 46 is defined by the track adjust cylinder 31, the hollow cylinder 33, the recoil stop 35 and the recoil piston 36. A portion of the oil volume 46 is an oil passage 41 defined through recoil stop 35. During a recoil event, oil moves through oil passage 41 to act on recoil piston 36. The gas volume 45 is defined by the gas plug 34, which may include a gas fill valve, the recoil piston 36 and hollow cylinder 33. Gas pressure in gas volume 45 biases recoil piston 36 toward contact with a first stop surface 42 on one side of recoil stop 35. At full recoil, the recoil piston 36 will move to a position in contact with a second stop surface 43 that may be an annular shoulder 49 on an inside surface of hollow cylinder 33. In the illustrated embodiment, the rear frame contact surface 40 of the ITAR unit 30 defines one end 47 of track adjust cylinder 31. The front frame contact surface may be an annular shoulder 48 on the outside of hollow cylinder 33. Finally, the second stop surface for the recoil piston 36 may be an annular shoulder 49 formed on an inside of hollow cylinder 33.

Although placement may be elsewhere, the track adjust cylinder 31 may include a rear oriented face 59 through which several passages have been formed to have valves mounted therein. In particular, a pressure relief valve 50, a bleed valve 51 and a fill valve 52 may be positioned at the rear oriented face 59 of track adjust cylinder 31. At this location, the back end 61 of the ITAR unit 30 is located below an access opening 60 through rear track roller frame 14. Thus, a technician may gain access to valves 50-52 to possibly bleed oil from the oil volume 46 using bleed valve 51, or to add oil or grease to oil volume 46 via fill valve 52. FIG. 4 shows the telescopic track roller frame 12 after a maximum rated amount of oil or grease have been added to oil volume 46 to provide added tension to track 17. In order to better isolate the gas volume 45 from the oil volume 46, a first sliding seal 53 may be positioned between an inner surface 54 of track adjust cylinder 31 and an outer surface 55 of the hollow cylinder 33. A second sliding seal 56 may be positioned between the inner surface 57 of the hollow cylinder 33 and a side surface 58 of recoil piston 36.

The ITAR unit is preferably preassembled as a stand alone unit prior to installation in telescopic track roller frame 12. During assembly, the ITAR unit may be slid into the front track roller frame 13. Next, this assembly is slid into the rear track roller frame 14 until contact end 40 comes in contact with contact surface 25 of rear track roller frame 14.

INDUSTRIAL APPLICABILITY

The present disclosure finds potential application in any track type machine that needs to be equipped to experience dynamic recoil events. The present disclosure finds specific application in track type tractors, especially large track type tractors that utilize telescopic track roller frames. Finally, the present disclosure may find general applicability to track type machines that utilize a single unit both to adjust track tension and resist recoil forces during a recoil event.

Referring back to the figures, a method of operating track type machine 10 may include moving the machine by moving track 17 around telescopic track roller frame 12. The front track roller frame 13 is moved into the rear track roller frame 14 of the telescopic track roller frame 12 responsive to a recoil force. This movement is resisted by compressing an ITAR unit 30 between the front track roller frame 13 and the rear track roller frame 14. During the compressing step, a recoil piston 36 moves toward an idler 16 that is mounted on the front track roller frame 13. After a recoil event, compressed gas acting on one side of recoil piston 36 will return the front track roller frame 13 back to an initial position with respect to the rear track roller frame 14, and recoil piston 36 will return to contact with a first stop surface 42 on recoil stop 35. At periodic intervals, the tension in track 17 may be adjusted by lengthening the ITAR unit 30 by adding oil or grease to oil volume 46 of the ITAR unit 30 through a fill valve 52, which may take the form of a typical grease zerk. Also, track tension may be relaxed by removing oil or grease from oil volume 46 by opening bleed valve 51. In other words, a technician may open access opening 60 that is located above back end 61 of the ITAR unit 30, and add an appropriate amount of grease to oil volume 46 to provide some desired tension in track 17. On rare occasions, a pressure relief valve 50 may open to allow oil to escape from grease volume of the ITAR unit 30 responsive to the recoil piston 36 contacting second stop surface 43 and pressure in the oil volume 46 exceeding a valve opening pressure.

The present disclosure shows an ITAR unit with a low part count and usage of several stock components, including but not limited to the valves 50-52, the gas plug 34, the recoil piston 36 and maybe the recoil stop 35. The track adjust cylinder 31 and the hollow cylinder 33 may be manufactured from a suitable alloy in a forging process known in the art. The illustrated design not only reduces part count, but reduces substantial weight over previous coil spring designs for large track type tractors of the type shown in FIG. 1 (e.g. Caterpillar D10). Thus, the ITAR unit of the present disclosure can incrementally reduce costs and simultaneously improve performance in track type machines that experience occasional or frequent dynamic recoil events.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An integrated track adjustment/recoil unit for installation in a track roller frame of a track type machine, the unit comprising:
    a track adjust cylinder defining a bore and including a rear frame contact surface;
    an accumulator module received in the bore of the track adjust cylinder;
    the accumulator module including a gas plug and a recoil stop mounted at opposite ends of a hollow cylinder, and further including a recoil piston slidably received in the hollow cylinder;
    the recoil stop defining an oil passage therethrough, and including a first stop surface;
    the hollow cylinder including a second stop surface and a front frame contact surface;
    the recoil piston being trapped to move between contact with the first stop surface and the second stop surface;
    the hollow cylinder, the recoil piston and the gas plug define a gas volume;
    the track adjust cylinder, the hollow cylinder, the recoil stop and the recoil piston define an oil volume; and
    the recoil piston being biased toward the first stop responsive to gas pressure in the gas volume.

2. The integrated track adjustment/recoil unit of claim 1 wherein the rear frame contact surface defines one end of the track adjust cylinder; the front frame contact surface is an annular shoulder on an outside of the hollow cylinder; and the second stop surface is an annular shoulder on an inside of the hollow cylinder.

3. The integrated track adjustment/recoil unit of claim 2 including a pressure relief valve, a bleed valve and a fill valve positioned at a rear oriented face of the track adjust cylinder.

4. The integrated track adjustment/recoil unit of claim 3 including a first sliding seal positioned between an inner surface of the track adjust cylinder and an outer surface of the hollow cylinder;
    a second sliding seal positioned between an inner surface of the hollow cylinder and a side surface of the recoil piston.

5. The integrated track adjustment/recoil unit of claim 4 wherein the track adjust cylinder moves with respect to the hollow cylinder a recoil distance during a recoil event; and
    the recoil piston moves with respect to the hollow cylinder a piston travel distance, which is greater than the recoil distance, during the recoil event.

6. A track type machine comprising:
    a machine body comprising a telescopic track roller frame that comprises a front track roller frame slidably received in a rear track roller frame along a recoil line;
    an idler mounted in the front track roller frame;
    a track mounted about the telescopic track roller frame in contact with the idler; and
    an integrated track adjustment/recoil unit operably mounted between the front track roller frame and the rear track roller frame, the integrated track adjustment/recoil unit defining an oil volume separated from a gas volume by a recoil piston,
    wherein:
    the recoil piston moves closer to the idler along the recoil line responsive to a recoil event in which the front track roller frame moves into the rear track roller frame;
    the integrated track adjustment/recoil unit comprises a hollow cylinder slidably received in a track adjust cylinder;
    the recoil piston is slidably received in the hollow cylinder;
    the hollow cylinder moves into the track adjust cylinder a recoil distance during a recoil event; and
    the recoil piston moves with respect to the hollow cylinder a piston travel distance, which is greater than the recoil distance, during the recoil event.

7. The track type machine of claim 6 wherein:
    the rear track roller frame comprises an access opening located above a back end of the integrated track adjustment/recoil unit; and
    the track adjust cylinder comprises a pressure relief valve, a bleed valve and a fill valve positioned at a rear oriented face of the track adjust cylinder adjacent the access opening.

8. The track type machine of claim 6 wherein the integrated track adjustment/recoil unit is unattached to, but trapped inside, the telescopic track roller frame.

9. The track type machine of claim 6 wherein a recoil force is transmitted from an annular shoulder on an inside surface of the front track roller frame to an annular shoulder on an outside surface of the integrated track adjustment/recoil unit; and
    the recoil force is transmitted from an end of the integrated track adjustment/recoil unit to a contact surface of the rear track roller frame.

10. The track type machine of claim 9 wherein the integrated track adjustment/recoil unit is unattached to, but trapped inside, the telescopic track roller frame.

11. The track type machine of claim 10 wherein:
    the rear track roller frame comprises an access opening located above a back end of the integrated track adjustment/recoil unit; and
    the track adjust cylinder comprises a pressure relief valve, a bleed valve and a fill valve positioned at a rear oriented face of the track adjust cylinder adjacent the access opening.

12. The track type machine of claim of claim 6, further comprising:
    a first sliding seal positioned between an inner surface of the track adjust cylinder and an outer surface of the hollow cylinder; and
    a second sliding seal positioned between an inner surface of the hollow cylinder and a side surface of the recoil piston.

13. The track type machine of claim of claim 12, wherein the recoil piston is trapped to move between contact with a recoil stop attached to one end of the hollow cylinder and an annular stop surface inside of the hollow cylinder.

14. A method of operating a track type machine comprising the steps of:
- moving the machine by moving a track around a telescopic track roller frame;
- moving a front track roller frame into a rear track roller frame responsive to a recoil force;
- resisting movement of the front track roller frame by compressing an integrated track adjustment/recoil unit between the front track roller frame and the rear track roller frame wherein the compressing step includes moving a recoil piston toward an idler mounted on the front track roller frame;
- returning the front track roller frame back to an initial position with respect to the rear track roller frame with gas pressure acting on one side of the recoil piston until the recoil piston contacts a first stop surface; and
- adjusting a tension in the track by lengthening the integrated track adjustment/recoil unit, wherein the lengthening step includes adding oil to an oil volume of the integrated track adjustment/recoil unit, wherein:
- the integrated track adjustment/recoil unit comprises a hollow cylinder slidably received in a track adjust cylinder;
- the recoil piston is slidably received in the hollow cylinder;
- the hollow cylinder moves into the track adjust cylinder a recoil distance during a recoil event; and
- the recoil piston moves with respect to the hollow cylinder a piston travel distance, which is greater than the recoil distance, during the recoil event.

15. The method of claim 14, further comprising: opening a pressure relief valve to an oil volume of the integrated track adjustment/recoil unit responsive to the recoil piston contacting a second stop surface and pressure in the oil volume exceeding a valve opening pressure.

* * * * *

UNITED STATES PATENT AND TRADEMARK OFFICE
CERTIFICATE OF CORRECTION

| | | |
|---|---|---|
| PATENT NO. | : 8,870,303 B2 | Page 1 of 1 |
| APPLICATION NO. | : 13/413165 | |
| DATED | : October 28, 2014 | |
| INVENTOR(S) | : Todd Edwin Moser | |

It is certified that error appears in the above-identified patent and that said Letters Patent is hereby corrected as shown below:

Claims

Column 7, line 10, in Claim 14, delete "frame" and insert -- frame, --.

Signed and Sealed this
Seventeenth Day of November, 2015

Michelle K. Lee
*Director of the United States Patent and Trademark Office*